UNITED STATES PATENT OFFICE.

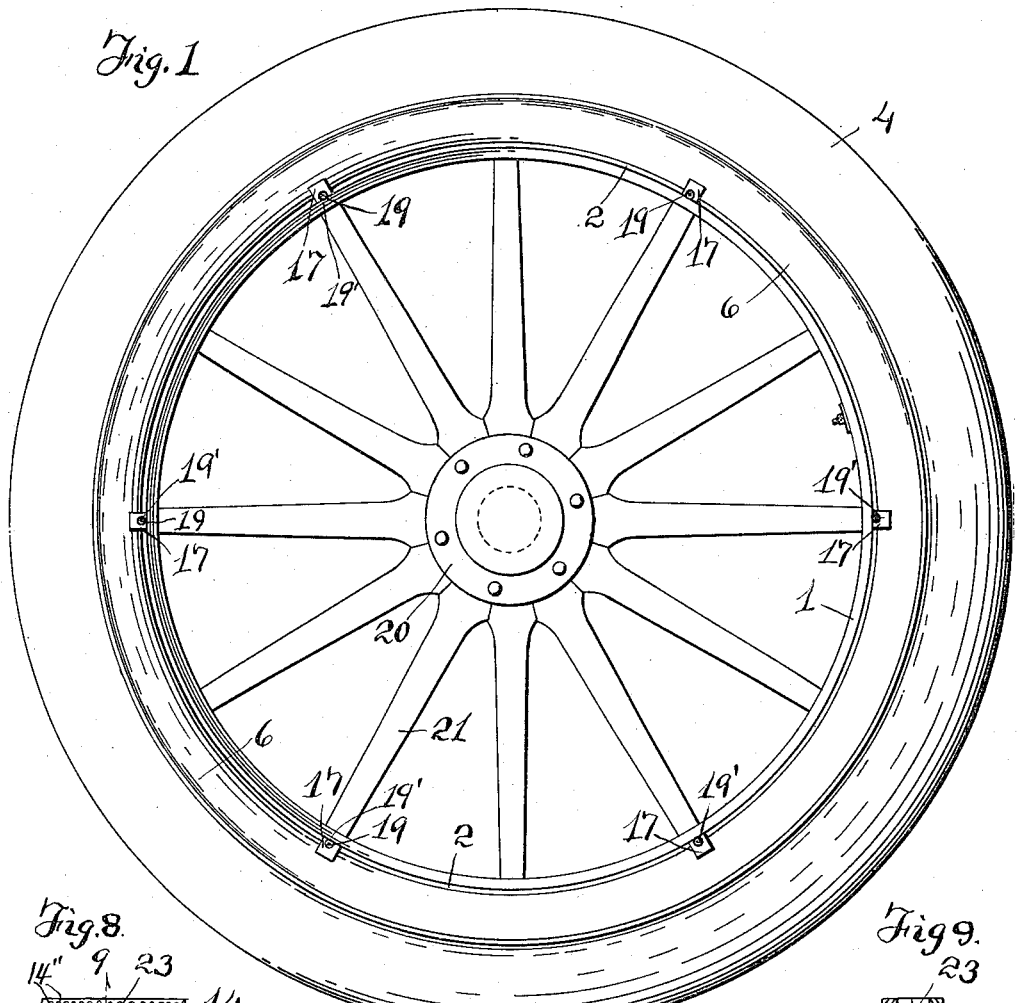
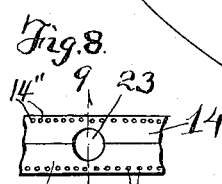
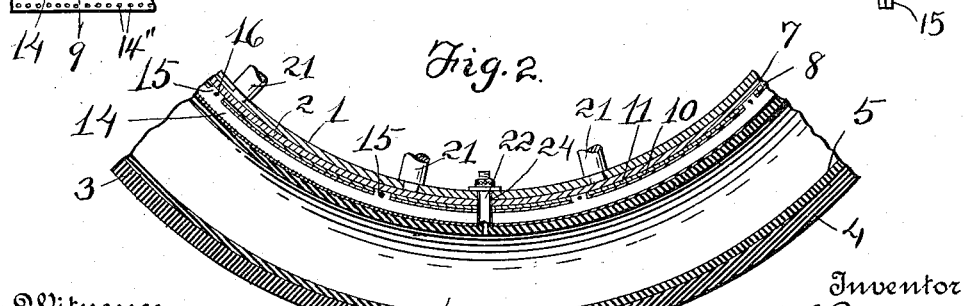

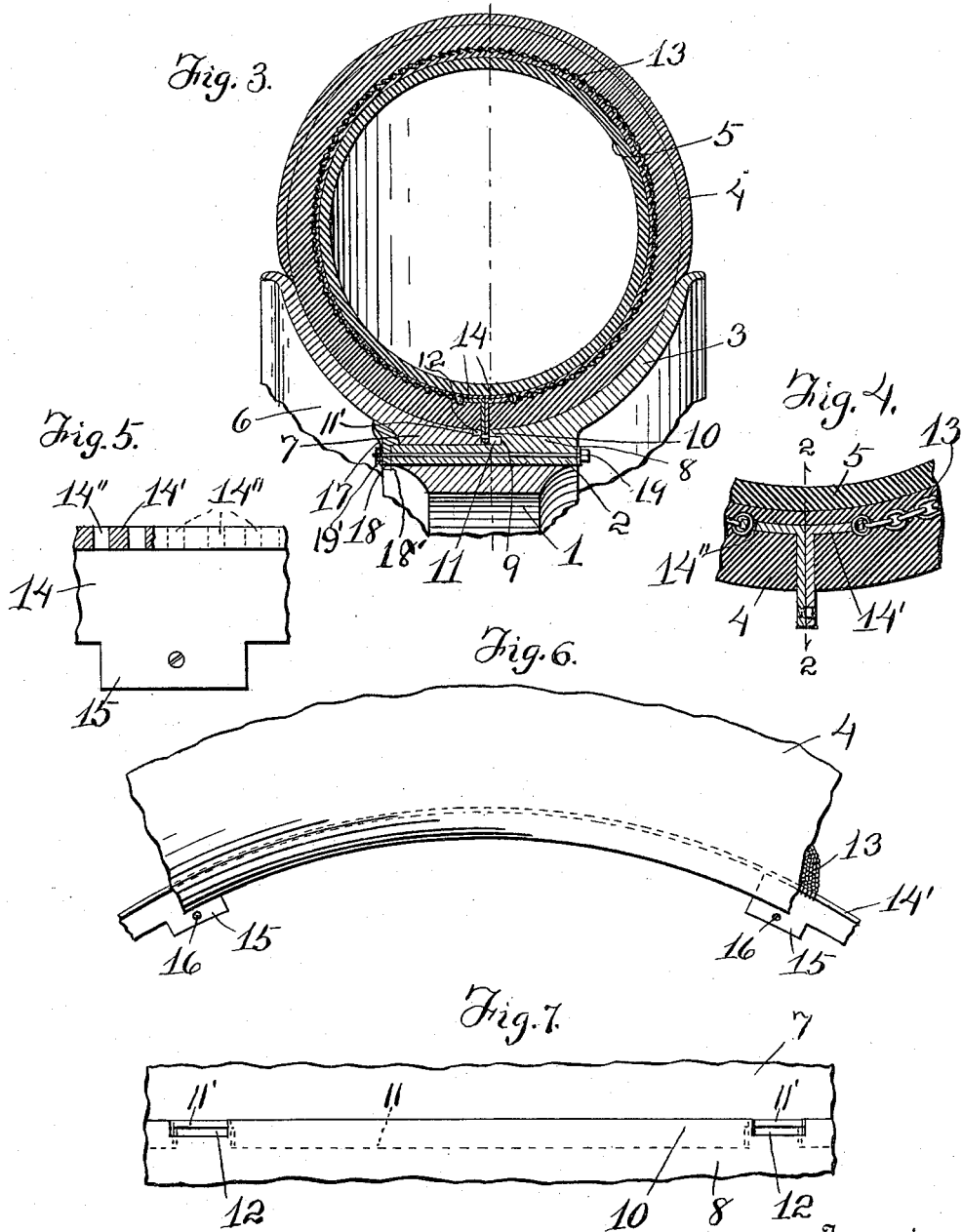

ULYSSES S. RENNE, OF SMITHLAND, IOWA.

WHEEL.

1,158,850.  Specification of Letters Patent.  Patented Nov. 2, 1915.

Application filed December 18, 1911. Serial No. 666,603.

*To all whom it may concern:*

Be it known that I, ULYSSES S. RENNE, a citizen of the United States, residing at Smithland, in the county of Woodbury and State of Iowa, have invented certain new and useful Improvements in Wheels; and I do hereby declare the following to be a full, clear, and exact description of the invention, such as will enable others skilled in the art to which it appertains to make and use the same.

This invention relates to improvements in resilient tired wheels, and more particularly to the type having a rim provided with a detachable section.

Many difficulties which constantly present themselves in the use of pneumatic tires are well known to those skilled in this art, and it is the object of the present invention to, so far as possible, eliminate such difficulties by the provision of means susceptible of easy and quick manipulation for enabling removal and application of the tire from and to the wheel for facilitating repair of the tire.

A further object is the effective anchoring of the tire to the wheel for insuring against creeping or dislocation.

With these and further detailed objects in view, as will in part become apparent and in part be stated, the invention comprises certain novel constructions, combinations and arrangements of parts as will be hereinafter described and claimed.

In the accompanying drawing,—Figure 1 is a view in side elevation of a wheel embodying the invention. Fig. 2 is a vertical section of a fragment of the wheel, the section being taken on the plane indicated by line 2—2 of Fig. 4. Fig. 3 is a vertical section across the felly, rim and tire of the wheel embodying the features of the present invention. Fig. 4 is an enlarged detail fragmentary cross section showing the connection of the tire plates. Fig. 5 is a fragmentary enlarged detail view of the tire plates partly in side elevation and partly in longitudinal section. Fig. 6 is a fragmentary, side view of a portion of the tire detached. Fig. 7 is a fragmentary, plan view of a portion of the rim. Figs. 8 and 9 are a detail, fragmentary, plan and cross section respectively of the anchoring rings at the place of penetration by the valve stem.

Referring to the drawing by numerals, 20 indicates the hub, and 21 the spokes of the wheel, which may be of the conventional type. A felly 1 is supported by spokes 21, and sustains the steel band 2 which is shrunk or otherwise fixedly mounted on the felly 1. The band 2 is formed preferably with an integral, substantially radial flange 3, of any well-known type adapted to engage one side of the shoe 4, the flange terminating at its inner edge in a thickened portion 8 formed integral with the band 2. Said shoe 4 incloses the usual inner tube 5. The band 2 and flange 3 may be considered the fixed section of the rim, and extending about the opposite edge of band 2 from that carrying flange 3 is the detachable section thereof, consisting of a flange 6 similar to flange 3 outstanding substantially radially from a ring 7 corresponding in thickness with the thickened portion 8. The thickened portion 8 is formed at its inner edge with a circumferential groove 9 leaving a laterally extending annular flange 10, and the ring 7 is formed with a corresponding flange 11 adapted to snugly fit within the groove 9 and thereby lap the flange 10, the outer face portion of the inner edge of the ring 7 being formed with an annular rabbet 11' snugly receiving the flange 10, so that a perfectly close joint is formed for providing an effective support for the shoe. The flanges 10 and 11 are formed with registering notches 12, 12, for receiving radially inwardly extending projections or plates 15, 15, connected with the shoe as hereinafter specified. Each notch 12 in each flange is of a depth that when the flanges are in their lapping position, an aperture-like pocket is formed through the flanges by each pair of registering notches, and plates 15 are thus firmly locked or anchored in place as long as the detachable section is held against displacement.

The shoe 4 may obviously assume various embodiments, but is preferably formed with an inner circumferential slit, so that it has separable edges which normally remain substantially in contact but may be opened up for the introduction or removal of the inner tube 5. Embedded within the material of the shoe 4 is preferably a chain mesh 13 which has its edges terminating along and adjacent to the edges of the shoe, and the edges of the shoe are bound by anchoring rings or angle plates 14, 14, each having its laterally extending flange 14' embedded within the material of its respective edge of shoe 4, and being formed with aperatures 14″ engaged by the terminal links along the respective edge of mesh 13, whereby the plates 14 are effectively anchored in the shoe, and the radial flange of each plate 14 extends inwardly to substantially the inner face of the shoe, except at spaced intervals, where the flange extends beyond the inner surface of the shoe and forms a projecting plate or engaging extension 15. The projections 15 of each angle plate 14 registers accurately with the corresponding projections of the other plate, and each of the thus-formed pairs of projections is detachably secured together preferably by a retaining screw 16 extending through the plates. The projections 15 are spaced apart circumferentially and proportioned in size and relatively positioned to fit the pockets formed by notches 12 when the parts are assembled. Each anchoring ring 14 is preferably of metal or other substantially rigid material, and armor 13 may also be of metal.

Retaining blocks or wedges 17 are spaced circumferentially about the rim. Each block is formed with a radially inwardly extending flange 18 formed with an opening through which extends the outer end of a bolt 19. The flange 18 of each block 17 normally extends into a notch 18′ formed in band 2 and snugly fits therein for relieving the respective bolt 19 from sheering strains. The bolt 19 is preferably extended through the material of rim 2 and is formed with a head at the inner edge of the rim, and the outer end of each bolt 19 extends beyond its respective block 17 and is engaged by a nut and locking washer 19′, so that the block may be tightened up by rotation of the nut in one direction, or loosened by rotation of the nut in the other. The main body of each block 17 lies outside of rim 2 and engages the detachable section for preventing detachment thereof. Obviously, other means of connection may be provided for the retaining blocks within the spirit and scope of this invention.

The parts of the rim, as clearly seen in Fig. 3, are so disposed that when the transversely arcuate flanges are employed, as shown in the drawing, a perfectly rounded concave seat is provided for the shoe in which it snugly fits and is held against dislodgment by its purchase on the rim through the engagement of the projections 15 therewith, in the pockets formed by notches 12.

The flange 11 is, of course, notched to accommodate valve stem 22 of tube 5, and the anchoring rings 14 are similarly notched as indicated at 23 in Figs. 8 and 9, the fixed section and flange 10 and felly 1 being apertured radially as at 24, for the passage of the valve stem.

In operation, assuming the parts to be in the position indicated in Fig. 3, when it is desired to remove the tire, the bolts 19 are revolved to remove blocks 17, and, after their removal, the detachable section may be readily slid axially off of the wheel; whereupon the tire is free to be removed axially from the wheel. In removing the tire it must be slid off first at a point substantially diametrically opposite the valve stem, and after a sufficient amount of the tire has been thus removed from the wheel, the valve stem engaged portion may be lifted sufficiently for removing the stem substantially radially from the wheel. To replace the tire, the parts being removed as stated, the valve stem is first inserted and the tire is then moved substantially axially onto the wheel, the projections 15 being seated in notches 12 of flange 10, and then the detachable section is applied axially until flange 11 arrives at its seat in groove 9, the notches 12 of flange 11 having been disposed to register with the projections 15 and to inclose them. Blocks 17 are readjusted and bolts 19 are tightened up, and the wheel is again ready for use.

What I claim is:

1. In a wheel, a wheel body, a fixed rim section thereon, a detachable rim section coöperating therewith, the said sections having lapping flanges notched to form pockets, a tire for the wheel having projections extending into the pockets, retaining wedges spaced circumferentially about the wheel and each having a shouldered portion resting on the periphery of the fixed section, and each of said wedges being formed with a radially inwardly extending flange, the fixed section being formed with a radial notch for each wedge into which the respective flange thereof extends, and means for locking the flanges of the wedges in the notches.

2. In a wheel, a wheel body, a fixed section comprising a band surrounding the wheel body and having a tire engaging flange, a detachable section coöperating with the fixed section, the detachable and fixed sections having interlocking flanges recessed to form pockets, a tire surrounding the fixed and detachable sections and having projections extending into the pockets, the detachable section having a tire engaging flange, and a retaining wedge having a shouldered portion resting on the fixed section, the tapered portion of the wedge engaging a similarly shaped portion of the detachable section for retaining it in its coöperative relation with the fixed section, and the wedge having a radially inwardly extending flange, a recess being formed through the material of the fixed section of a size and location adapted to snugly receive the flange of the wedge for retaining the wedge against circumferential movement and preventing portions of the flange extending laterally outside of the planes of the rim, and means for preventing lateral outward movement of the wedge.

3. In a wheel, a wheel body, a fixed rim section thereon, a detachable rim section coöperating therewith, each section having a flange extending toward the other and adapted to overlap the flange of the fixed section being outside of the other flange, lapping portions of the flanges being notched to form a pocket, a tire for the wheel having a projection extending into the pocket, a wedging block having a face corresponding in lateral contour to the lateral contour of the engaged portion of the detachable section and engaging the outer face of the detachable section, and means for drawing the wedging block axially inwardly for locking the detachable section against lateral separation from the fixed section.

In testimony whereof I affix my signature in presence of two witnesses.

ULYSSES S. RENNE.

Witnesses:
DOLLIE C. SMITH,
LULU ELY.

Copies of this patent may be obtained for five cents each, by addressing the "Commissioner of Patents, Washington, D. C."